(12) United States Patent
Garrett et al.

(10) Patent No.: US 10,065,807 B1
(45) Date of Patent: Sep. 4, 2018

(54) DUAL SIDED GRAVITY SORTING CONVEYER

(71) Applicant: Amazon Technologies, Inc., Seattle, WA (US)

(72) Inventors: Samuel Gardner Garrett, Seattle, WA (US); Emily Dunne, Seattle, WA (US); Akshay Tilekar, Seattle, WA (US); Unnikrishnan Vadakkanmaruveedu, Chandler, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/604,296

(22) Filed: May 24, 2017

(51) Int. Cl.
| | |
|---|---|
| *B65G 47/10* | (2006.01) |
| *B65G 47/46* | (2006.01) |
| *B65G 47/96* | (2006.01) |
| *B65G 47/76* | (2006.01) |

(52) U.S. Cl.
CPC ......... *B65G 47/965* (2013.01); *B65G 47/763* (2013.01)

(58) Field of Classification Search
CPC ..... B65G 47/96; B65G 47/962; B65G 47/965
USPC ...................... 198/370.04; 209/698; 414/382
See application file for complete search history.

(56) References Cited

U.S. PATENT DOCUMENTS

| | | | | |
|---|---|---|---|---|
| 2,714,355 A | * | 8/1955 | Benson | B61L 23/005 104/295 |
| 3,360,106 A | * | 12/1967 | Harrison | B65G 47/962 198/370.04 |
| 3,386,563 A | * | 6/1968 | Harrison | B65G 47/965 198/370.04 |
| 3,463,298 A | * | 8/1969 | Harrison | B65G 47/965 198/370.04 |
| 5,086,929 A | * | 2/1992 | Richter | B07C 3/082 198/370.04 |

* cited by examiner

*Primary Examiner* — William Ray Harp
(74) *Attorney, Agent, or Firm* — Kilpatrick Townsend & Stockton LLP

(57) ABSTRACT

A conveyor for use in an inventory management system includes a body, one or more displacement elements connected with the body for interfacing with and moving the conveyor along rails, and a sorting mechanism for selectively depositing items from the conveyor to either side of the conveyor. A sorting mechanism includes first and second hinge release assemblies for connecting with, and selectively releasing, a panel that supports the item at either of respective first and second panel ends to allow the panel to fully disconnect at one of the ends and swing open in the first or second direction.

23 Claims, 13 Drawing Sheets

DUAL SIDED GRAVITY SORTING CONVEYER

BACKGROUND

Containers and individual items are constantly packed and unpacked in fulfillment centers that manage movement and storage of items sold on electronic marketplaces. In modern warehouses or fulfillment centers, automation is heavily used and items are often sorted and moved to different locations by item conveyors. Some item conveyors transport items directly into containers, to workstations accessible to human workers, or to alternative conveyors for moving the items about the fulfillment center.

One type of conveyor is a rail-mounted conveyor which moves items through the inventory management facility using one or more fixed rails. Inventory management systems based on rail-mounted conveyors include a rail that transits through the inventory management facility and transits above multiple potential destinations for an item that is to be sorted and sent to a particular destination in the facility (e.g., to shipping, to a particular storage location, or any other suitable location).

BRIEF DESCRIPTION OF THE DRAWINGS

Various embodiments in accordance with the present disclosure will be described with reference to the drawings, in which.

DETAILED DESCRIPTION

Figure 1:
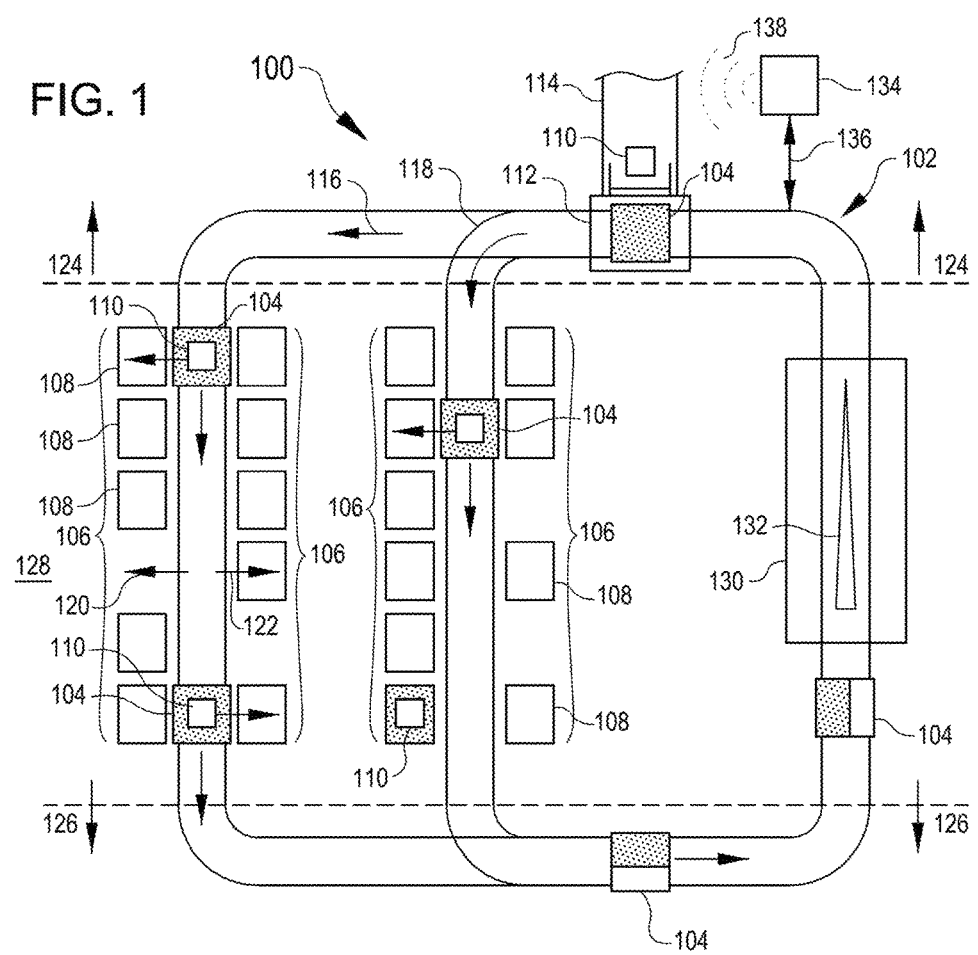
FIG. 1 is a schematic top view of a rail-based inventory management system employing dual-sided gravity sorting conveyors.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments herein described relate to conveyers for transporting items in an inventory management system that can sort items in at least two directions, e.g. to two opposite sides of the conveyer. According to various embodiments, a conveyor includes a frame and at least one displacement element, such as a motor, magnetic or inductive drive, or comparable drive, connected with the frame and configured for interfacing with a conveyance path defined by support rails in the inventory management system. The conveyor is generally a discrete means of conveyance, such as a cart, shuttle, bin, or other suitable rail-mounted conveyor having a platform therein that supports an item to be sorted. The displacement elements operate to move the conveyor along the conveyance path. The conveyor includes a sorting mechanism that includes two controllable hinge assemblies connected with the frame at opposite sides of the frame, and a panel having first and second connectors positioned at respective first and second panel ends that interface with the controllable hinge assemblies. In operation, each connector is releasably and pivotally connected with its respective controllable hinge assembly. A control mechanism is operable to selectively release the panel via the sorting mechanism independently at each of the controllable hinge assemblies, so that the panel can assume a closed position, where the panel is substantially horizontal and configured to retain an item, a first open position, where the panel allows an item to drop in a first direction, or a second open position, where the panel allows an item to drop in a second direction opposite the first. In accordance with various embodiments, various mechanisms can be used to retain the panel at the controllable hinge assemblies, to launch the panel when released, to recover the panel to the closed position after a sorting operation, or to sort items with more granularity using variations of the first and second open positions.

Embodiments herein also relate to systems and methods for sorting items in an inventory management system using dual-sided sorting conveyers. According to some embodiments, a method of sorting items can include receiving instructions to deposit an item at a receiving station in an inventory management system. The item can then be placed on a panel in a rail-mounted conveyor cart, which moves the item along a conveyance path to bring the item to a position adjacent to two or more receiving stations, of which one is an intended destination of the item. When the conveyor has reached the correct position, the system can cause a first controllable hinge assembly of the rail-mounted conveyor cart to release, to selectively open the panel of the conveyor cart from a closed position where the panel supports the item to a first open configuration such that the item is deposited in the first receiving station via gravity. The system can deposit items to both sides of the conveyor cart. For example, the conveyor can instead cause a second controllable hinge assembly, different than the first, to release to selectively open the panel to a second open configuration such that the item is deposited in a second direction, opposing the first direction, to a different receiving station.

FIG. 1 is a schematic top view of a first rail-based inventory management system 100 employing dual-sided gravity sorting conveyors 104 that operate along a conveyance path 102, in accordance with embodiments. A conveyance path can include any suitable rail or track-based path for directing a conveyor. In specific embodiments, the conveyance path 102 as shown can be defined by one rail or a pair of rails. Similarly, conveyors 104 are shown as conveyor carts, but may be any suitable, discrete means of conveyance for an item. The system 100 includes first and second branched conveyance paths 116, 118, each conveyance path bordered by multiple sets 106 of individual receiving stations 108, the sets being positioned on both sides of each conveyance path. Alternatively, various inventory management systems can employ fewer branched paths (e.g., a single circuit), or can employ more than two branched paths for diverting items throughout a complex inventory management system. In some embodiments, an inventory management system 100 can include an upstream portion 124 in which the conveyance path 102 branches to divert conveyors 104 in multiple directions, a working portion 128 in which the conveyors pass by and can direct items to the receiving stations 108, and a downstream portion 126, in which the conveyors 104 are merged back to a singular conveyance path 102 to be reset, maintained, and/or to receive additional items for sorting.

Items 110 can be transported throughout the inventory management system 100 by the conveyors 104. In specific embodiments, the items 110 can be introduced to the inventory management system 100 in one or more item transfer sites 112 by an item transfer component 114, which can be any suitable mechanism for transferring an item to a conveyor, such as a robotic arm, conveyor belt, discrete mechanical or robotic conveyor, chute, or other comparable device. Once loaded to a conveyor 104, an item 110 can be transited along the conveyance path 102 by the conveyor to any specific one of the individual receiving stations 108. The conveyors 104 are each operable to deposit items in both a first direction 120 relative to the conveyor and/or conveyance path 102, and in a second direction 122 opposite the first direction. The conveyors 104 deposit items in the first direction or in the second direction by selectively releasing a side of a panel in the floor of the conveyor, either opening a first side of the panel in a first open position where the conveyor 104 is configured to direct an item 110 in the first direction 120, or opening a second side of the panel in a second open position where the conveyor 104 is configured to direct the item 110 in the second direction 122.

According to some embodiments, conveyors 104 can include integrated mechanisms for recovering the panel to a closed position. However, in some embodiments, conveyors 104 require external force to recover a panel, in which case, conveyors 104 can pass through a recovery mechanism 130 which acts externally on each respective conveyor to restore the panel to a closed position. According to some embodiments, a recovery system can include a sloped element 132 such as a rail, ramp, or any other suitable extension positioned to close the panel as the conveyor 104 passes by mechanically interfering with the panel. For example, the recovery mechanism 130 may include a ramp that extends upwardly and parallel to the rail from an upstream portion of the recovery mechanism 130 to a downstream portion of the recovery mechanism. The ramp is configured to engage a downwardly extending portion of the panel and lift that downwardly extending portion of the panel upward toward the closed position as the conveyor 104 moves to the downstream portion of the recovery mechanism along the upwardly extending ramp.

The components of the inventory management system 100 can be operated under the control of a management component 134, which is operable to control aspects of the system such as, but not limited to, receiving instructions to deposit individual items 110 at particular receiving stations 108, instructing conveyors 104 to receive the items and transit accordingly to particular regions of the inventory management system corresponding to the receiving stations, and causing the conveyors to selectively sort the items to the correct receiving station once positioned, or while passing by, the receiving station. The management component 134 can, in some cases, communicate with integrated onboard controllers of each conveyor and system component, in some cases via a network 138, which can include any suitable wired or wireless data network; or in some cases via a connection 136 and the conveyance path 102. Specific details of various embodiments of the conveyors 104 are discussed in greater detail with respect to FIGS. 2-9.

Figure 2:
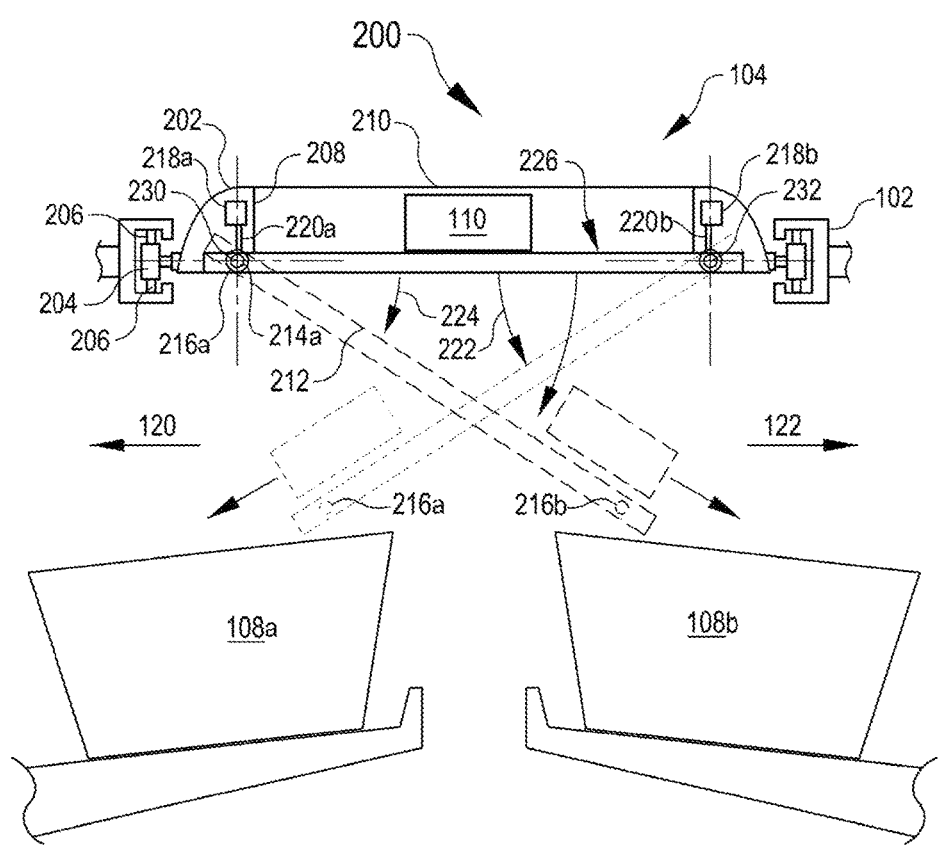
FIG. 2 is a side section view of a dual-sided gravity sorting conveyor and rails positioned relative to two receiving bins, in accordance with embodiments.

FIG. 2 is a side section view of a second rail-based inventory management system 200 showing a dual-sided gravity sorting conveyor 104 connected with a conveyance path 102, and positioned relative to two receiving bins 108a, 108b, in accordance with embodiments. The conveyance path 102 is shown in a cross-sectional view directed into and out of the page. The conveyance path 102, as shown, includes two rails positioned at opposite sides of the conveyor 104. The conveyor 104 includes a frame 202 which provides structure for the conveyor, and to which the working parts of the conveyor are connected.

The conveyor 104 is connected with the conveyance path 102 via displacement elements 204 which extends from the frame 202. The displacement elements 204 can be any suitable displacement element, such as a wheeled assembly, magnetic or inductive assembly, or other drive for moving the conveyor 104 along the conveyance path 102. A wheeled assembly, as shown, includes one or more drive wheels 206 connected with the displacement element 204, and operable to move the conveyer along the conveyance path 102.

The frame 202 of the conveyor 104 includes at least two side elements 208, which can retain the working components of the conveyor, define the structure of the conveyor, and provide a sidewall to prevent items from being jostled loose from the conveyor 104 when in transit. In some embodiments, the frame 202 is also connected with front and/or back panels 210 for connecting the frame together and for preventing items from falling off of a front or back of the conveyor. A panel 212 is pivotably and also removably connected with the frame 202 via first and second controllable hinge assemblies 230, 232 each assembly defining respective first and second axes of rotation around which the panel can rotate when disconnected from one of the conveyor 104 at the other of the two controllable hinge assemblies. The first controllable hinge assembly 230 has a first portion 216a coupled to the panel and a second portion 214a coupled to the frame. The second controllable hinge assembly 232 has a first portion 216b coupled to the panel 212 and a second portion 214b coupled to the frame. According to embodiments, each of the respective second portions 214a,b of the first and second controllable hinge assemblies 230,232 can define a respective controllable hinge element configured to release a respective first portion 216a,b; each first portion 216a,b defining a respective connective element that interacts with the second portions to retain the panel. The first and second second portions 214a,b (cumulatively 214). When the panel 212 is configured in a closed position 226, the panel is capable of holding the item 110 thereon.

Second portions 214 are connected at both ends of the frame 202 and operable to hold the panel 212, e.g., via first and second first portions 216a, 216b (cumulatively 216) of each panel. According to some embodiments, the first portions 216 include permanent magnets or magentizable elements embedded in the panel 212; and the second portions 214 include electromagnets embedded in the frame 202 and positioned to align with the first portions when the panel is in a closed position or transport configuration. The second portions 214 are each capable of disconnecting the panel 212 from the frame 202 in order to allow the panel to pivot freely about the other second portion. Thus, each of the second portions 214 defines a respective pivot axis, e.g., a first pivot axis at the first controllable hinge assembly 230 and second pivot axis at the second controllable hinge assembly 232. For example, the panel 212 can rotate to a first open position 222 by pivoting around the second pivot axis at the second controllable hinge assembly 232, in order to open the conveyor 104 in a first direction 120, which causes the conveyor to drop the item 110 toward the first receiving station 108a in the first direction. However, the panel 212 can instead rotate to a second open position 224 by pivoting around the first pivot axis at the first controllable hinge assembly 230, which causes the conveyor to drop the item 110 toward a second receiving station 108b in a second direction 122. Control elements 218a, 218b associated with the first and second second portions 214a, 214b are capable of receiving instructions to independently release the panel at one or the other of the respective second portions 214, e.g. controlling the controllable hinge assemblies 230, 232 via control circuits 220a, 220b.

The ability of the conveyor 104 to fully disengage from one end or the other end of the panel 212 minimizes moving parts in the system, while providing for the rapid sorting of items in at least two directions from each conveyor 104, minimizing volumetric constraints of a physical sorting system, and also minimizing travel time of conveyors transiting the inventory system.

Figure 3:
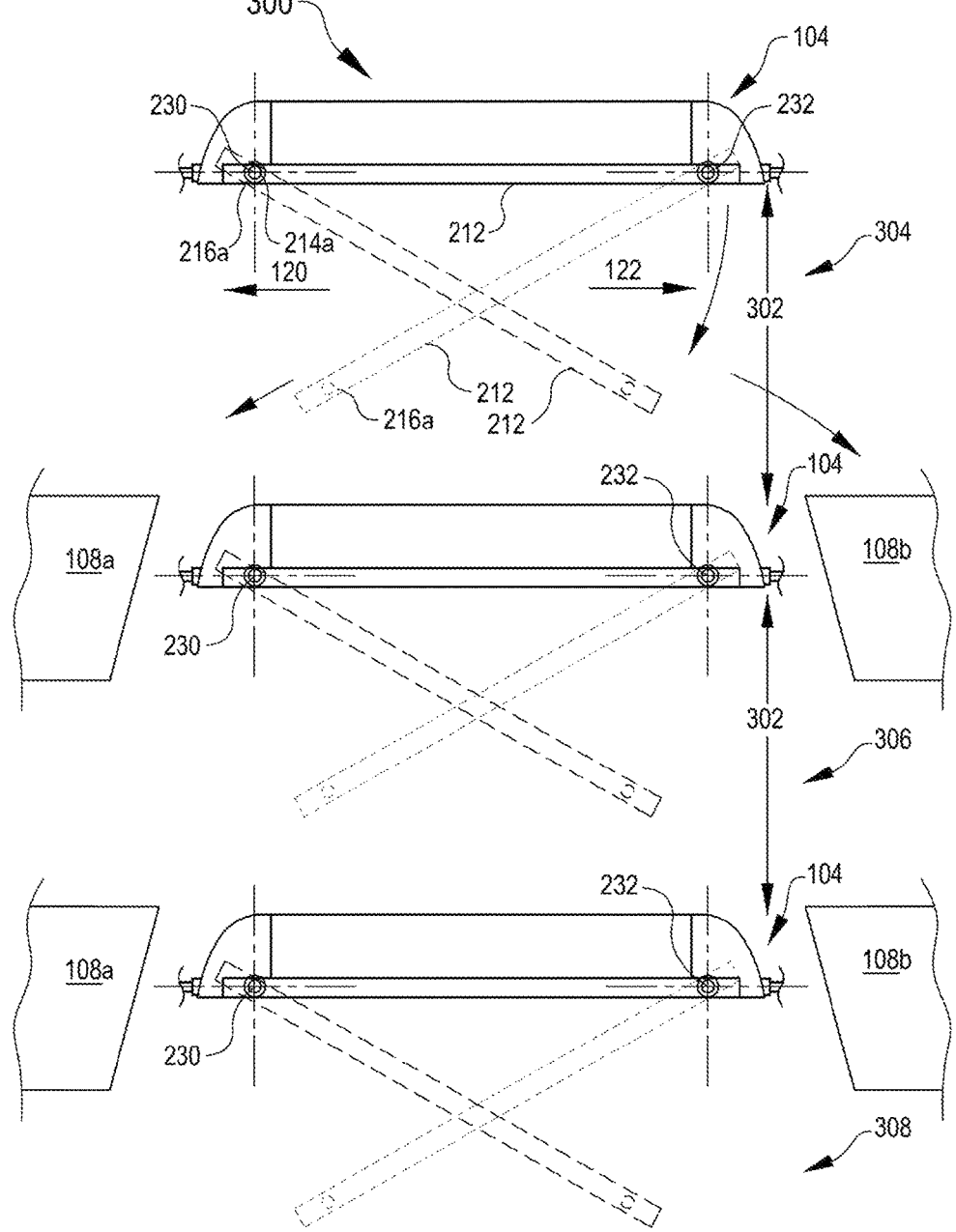
FIG. 3 is a side section view of a stacked configuration of dual sided gravity sorting conveyors connected with rails and positioned to deposit items among multiple receiving bins that are also in stacked configurations.

FIG. 3 is a side section view of a third rail-based inventory management system 300 employing a stacked configuration of dual sided gravity sorting conveyors 104 positioned to deposit items among multiple, vertically stacked receiving bins 108a, 108b, in accordance with embodiments. Each conveyor 104 corresponds to a respective layer 304, 306, 308 in which the conveyor is positioned to direct items between a respective pair of receiving stations 108. Each conveyor 104 is positioned at a predetermined height or clearance 302 above a conveyor positioned below, where the height is limited by the amount of space required to divert an item from each conveyor to its respective receiving stations 108, i.e. by the vertical distance that the panel 212 obstructs when open in a released configuration. Various forms of receiving stations 108 can be used, including bins, shelves, bags, chutes, or comparable elements. In some embodiments, the receiving stations 108 can, themselves, include conveyances operable to move the item in a secondary sorting system. By employing dual-sided sorting functionality, the inventory management system 300 can position the receiving stations 108 alongside the conveyors 104 rather than beneath them, in contrast with traditional conveyors which unload items directly downward. This side-by-side configuration allows for stacking of multiple layers 304, 306, and 308 in order to greatly increase the available density of sorting conveyors and increase efficiency in a sorting system.

As described above with reference to FIG. 2, the conveyer 104 can divert an item thereon in either the first direction 120 or the second direction 122 by opening selectively opening a panel 212 in either of those directions. The panel 212 can be opened by selectively releasing one of the first portions 216 positioned at either of the two ends of the panel from its respective controllable hinge assembly 214 at either end of the panel. The panel 212, when released by one or the other of the hinge assemblies 214, can freely rotate about either a first controllable hinge assembly 230, or a second controllable hinge assembly 232. In some embodiments, the conveyer 104 can be modified to restrict the degree of rotation that the panel can transit in order to control the angle at which an item slides off of the panel 212, or to limit the clearance 302 required between each layer 304, 306, or 308.

The variations of inventory management systems described above can be applied together in combination except where explicitly stated otherwise. In addition, various embodiments of specific sorting mechanisms for the conveyances may be combined with any suitable combination of inventory management system components. Several embodiments of specific sorting mechanisms are described below with reference to FIGS. 4-9.

Figure 4:
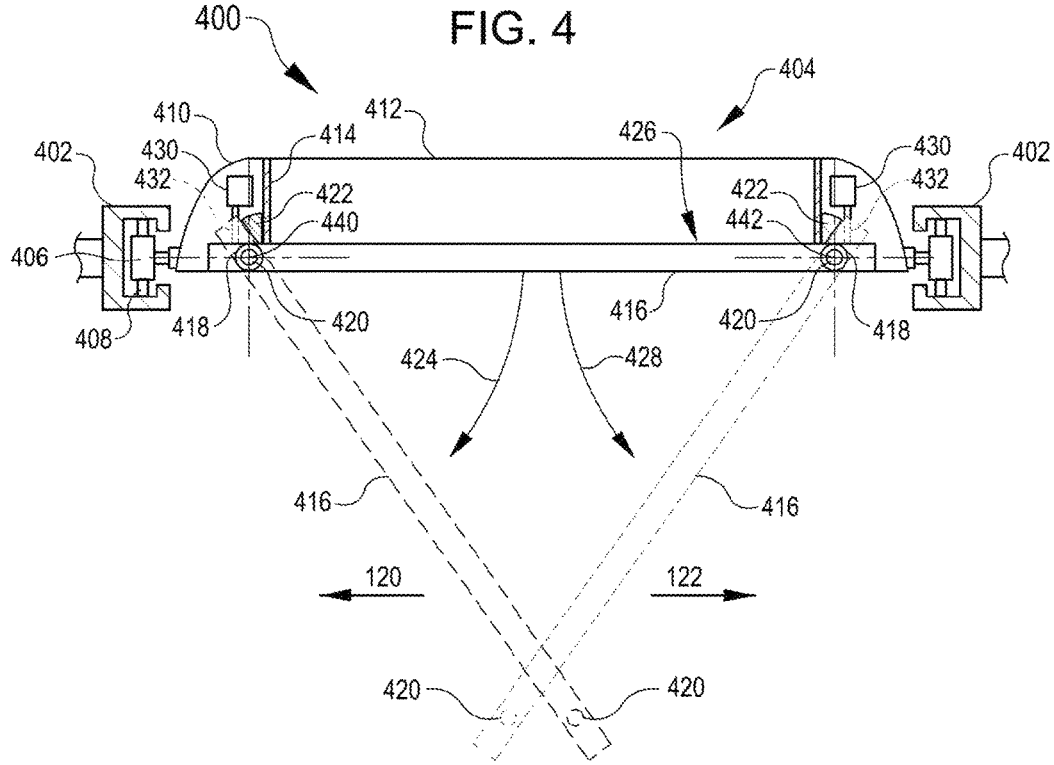
FIG. 4 is a side section view of a conveyor employing a first example of a dual-sided sorting mechanism.

FIG. 4 is a side section view of a first example of a dual-sided sorting mechanism 400, in accordance with embodiments. The sorting mechanism 400 is connected with a conveyor 202 that includes a frame 410, a front or back panel 412, and side elements 414 for providing structure and retaining an item. The conveyor 404 is configured to transit on a conveyance path 402 via displacement elements 406, which interact with the conveyance path by way of wheels 408. The panel 416 is pivotably and also removably connected with the frame 410 via first and second controllable hinge assemblies 440, 442 each assembly defining respective first and second axes of rotation around which the panel can rotate when disconnected from the frame at the other of the two controllable hinge assemblies. The first controllable hinge assembly 440 has a first portion 420a coupled to the panel 416 and a second portion 418a coupled to the frame. The second controllable hinge assembly 442 has a first portion 420b coupled to the panel 416 and a second portion 418b coupled to the frame 410. According to embodiments, each of the respective second portions 418a,b of the first and second controllable hinge assemblies 440,442 can define a respective controllable hinge element configured to release a respective first portion 420a,b; each first portion defining a respective connective element that interacts with the second portions to retain the panel.

First and second second portions 418a, 418b (cumulatively 418) of the controllable hinge assemblies 440, 442 are connected with the frame 410 at positions near two ends of the frame, and support the panel 416 by way of interfacing with first and second first portions 420a, 420b of the panel. The second portions 418 can connect with the respective first portions 420 via various specific mechanisms, e.g., by way of a retractable pin, by way of magnetism, or other comparable mechanisms. In accordance with some embodiments, the second portions 418 are electromagnets embedded in the frame 410. Such electomagetics can draw power from a power source via the control elements 430a, 430b (cumulatively 430) and control circuits 432a, 432b in order to produce a strong magnetic field and support the panel 416. The panel 416 can include multiple magnetic or magentizable elements integrated therein at the each of the first portions 420. According to some embodiments, the panel 416 can include permanent magnets at the first portions 420, such as neodymium or other strong rare-earth magnets, configured to generate a force sufficient to support the panel 416 in the closed configuration when placed in proximity to active electromagnets in the second portions 418. However, according to some other embodiments, the first portions 420 can include weaker permanent magnets, or even magentizable materials such as iron inserts. When one or another of the two second elements 418 is deactivated by the control elements 430, the supporting force of the respective hinge assembly of the two controllable hinge assemblies 440, 442 is diminished and a corresponding end of the panel 416 falls open, rotating about the other hinge assembly 418.

The controllable hinge assemblies 440, 442, as defined by the second elements 418, when connected with the panel 416 by the first portions 420, define respective first and second pivot axes, the first pivot axis defined by the first controllable hinge assembly 440 and the second pivot axis defined by the second controllable hinge assembly 442. While the panel 416 is retained by both of the controllable hinge assemblies 440, 442, the panel is retained in a closed position 426, corresponding to a transport configuration in which the conveyer 404 is operable to carry an item. According to embodiments, the panel 416 can open in a first direction 120 when fully released from the first controllable hinge assembly 440 and allowed to rotate freely about the second controllable hinge assembly 442, thereby assuming a first released configuration 428. Similarly, the panel 416 can open in a second direction 122 when allowed to rotate freely about the first controllable hinge assembly 440, thereby assuming a second open position 424. Specific variations of controllable hinge assemblies, connective elements therein, and other aspects of dual-sided sorting mechanisms are described below with reference to FIGS. 5-9, in accordance with embodiments.

Figure 5:
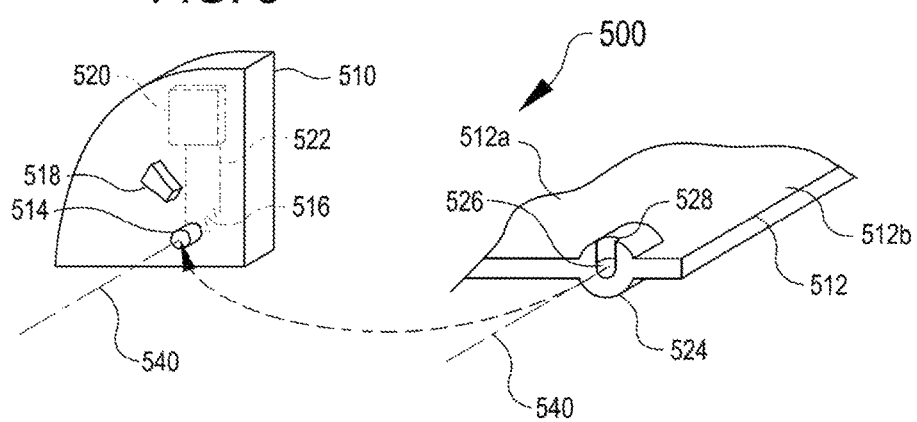
FIG. 5 shows a second example of a dual-sided sorting mechanism for a conveyor.

FIG. 5 shows a second example of a dual-sided sorting mechanism 500 for a conveyor, in accordance with embodiments. A partial section of a conveyor frame 510 is shown, including therein an embedded control mechanism 520 and control circuit 522 connected with an actuator 516. The actuator 516 is operably linked with a retractable pin 514, which acts as a second portion (i.e. controllable portion) of a controllable hinge assembly for the sorting mechanism 500. A connector 524 in the panel 512 acts as a first portion of the controllable hinge assembly. The panel 512 can be retained at the pin 514, released at the pin, or can rotate about a pivot axis 540 defined by the pin and connector 524 when retained at the pin and released at a second controllable hinge assembly (not shown).

A partial section of a panel 512 is shown, with its associated portion of the frame 510 rotated 180 degrees to illustrate detail of a panel connector 524 configured to interface with the retractable pin 514, in accordance with embodiments. The panel connector 524 includes a pin receiving depression 526 for retaining the retractable pin 514 when the retractable pin is extended, and a groove 528 for interacting with the retractable pin and depressing the retractable pin when the panel is restored from an open position to a closed position. In operation, the panel 512 is supported on both sides at the panel connector 512 by the retractable pin 514 until the control mechanism 520 causes the retractable pin on one of the sides to retract into the frame 510 via the actuator 516, at which time the panel drops and rotates about the side of the panel that is still connected to the frame.

When an opposing controllable hinge assembly (not shown) is released instead, the panel 512 rotates about the pivot axis 540 defined by the retractable pin 514 and panel connector 524 as it is supported by the retractable pin. In such an event, a working portion of the panel 512a will drop, while a peripheral portion of the panel 512b will rise. The peripheral portion 512b can interact with a stop element 518 connected with the frame 510, so that the rotation of the panel is stopped short at an angle that is predetermined based on the position of the stop element. For example, the stop element may be configured to stop the panel from rotating more than 45 degrees from its closed position in order to direct the item 110 to a bin disposed to the side of the frame from which the hinge has been released.

Figure 6:
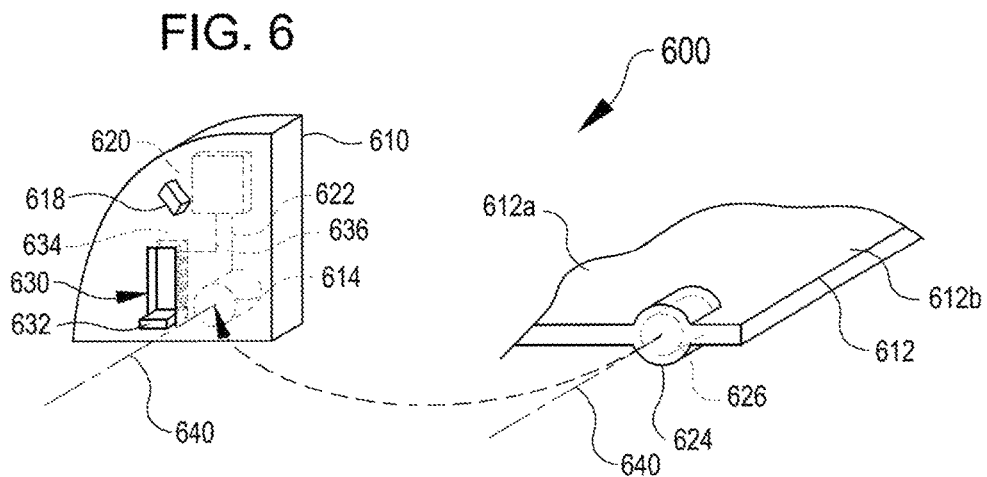
FIG. 6 shows a third example of a dual-sided sorting mechanism for a conveyor.

FIG. 6 shows a third example of a dual-sided sorting mechanism 600 for a conveyor, in accordance with embodiments. A partial section of a conveyor frame 610 is shown, including therein an embedded control mechanism 620 and control circuit 622 connected with an electromagnetic element 614. The electromagnetic element 614 acts as a second portion (i.e. controllable portion) of a controllable hinge assembly for the sorting mechanism 600. A magnetic or magentizable panel connector 624 acts as a first portion of the controllable hinge assembly. The panel 612 can be retained at the electromagnetic element 614, released at the electromagnetic element, or can rotate about a pivot axis 640 defined by the electromagnetic element and panel connector 624 when the connector is retained at the electromagnetic element and released at a second controllable hinge assembly (not shown).

A partial section of a panel 612 is shown, with its associated portion of the frame 610 rotated 180 degrees to illustrate detail of a panel connector 624 configured to interface with the electromagnetic element 614, in accordance with embodiments. The panel connector 624 is defined by a surface containing an embedded magnetic or magentizable element 626, such as a permanent magnet. In operation, the panel 612 is supported at the panel connector 612 by the electromagnetic element 614 until the control mechanism 620 causes the electromagnetic element to deactivate or to disengage, at which time the panel rotates about a controllable hinge assembly where the panel is still connected to the frame. In some cases, the electromagnetic element 614 can be disengaged without moving parts by, e.g., cutting a power supply to the electromagnetic element. In some other embodiments, the electromagnetic element 614 may be reversed, shielded, or moved away from an interior wall of the frame 610.

According to some embodiments, the sorting mechanism 600 can include features for accelerating the transition of the panel 612 from a closed to an open state. For example, an actuator assembly 630 including an extension 632 and an actuator 634 can be connected or integrated with the frame 610 and connect with an extension 632 positioned to interfere with the panel 612 when the panel is interfaced with the frame. The actuator assembly 630 can then be activated, e.g. by the control mechanism 620 by way of a second control circuit 636, to apply an impulse to the panel. As shown, the actuator assembly 630 is positioned distal of the pivot axis 640 compared to the panel 612 so that it interacts with a periphery 612b of the panel 612. However, in alternative embodiments, the actuator 630 can be positioned proximal to the panel 612, so that the actuator interacts with a working portion 612a of the panel. A stop element 618 can also be connected with the frame 610 to stop rotation of the panel 612. Similar to the stop element described in relation to FIG. 5, stop element 618 may be configured to stop the panel from rotating more than 45 degrees from its closed position in order to direct the item 110 to a bin disposed to the side of the frame from which the hinge has been released. In specific embodiments, the angle of rotation defining the released configuration can vary from about 25 degrees to about 55 degrees, or in some cases, from 35 to 50 degrees. In specific embodiments the angle of rotation defining the released configuration is approximately 45 degrees.

Figure 7:
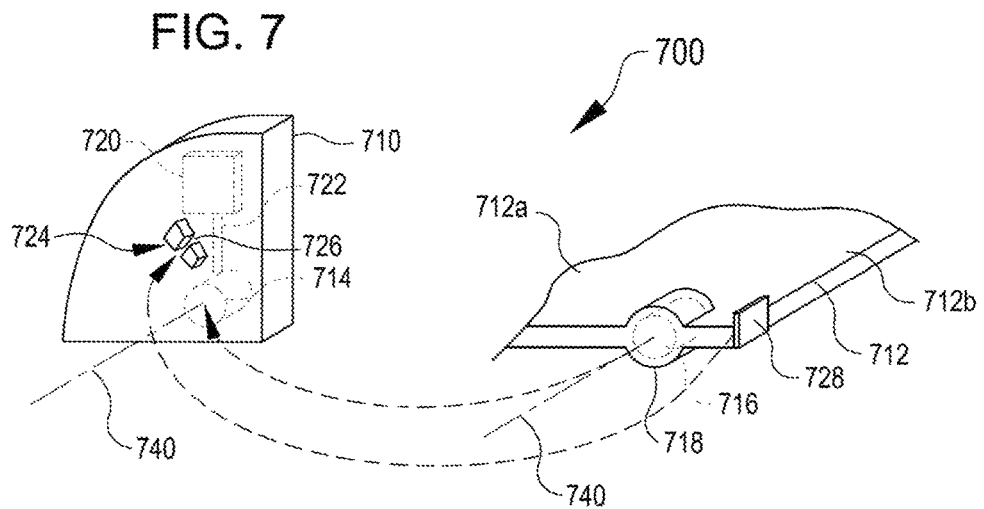
FIG. 7 shows a fourth example of a dual-sided sorting mechanism for a conveyor.

FIG. 7 shows a fourth example of a dual-sided sorting mechanism 700 for a conveyor, in accordance with embodiments. A partial section of a conveyor frame 710 is shown, including therein an embedded control mechanism 720 and control circuit 722 connected with an electromagnetic element 714. The electromagnetic element 714 acts as a second portion (i.e. controllable portion) of a controllable hinge assembly for the sorting mechanism 700. A magnetic or magetizable panel connector 718 acts as a first portion of the controllable hinge assembly. The panel 712 can be retained at the electromagnetic element 714, released at the electromagnetic element, or can rotate about a pivot axis 740 defined by the electromagnetic element and panel connector 718 when the connector is retained at the electromagnetic element and released at a second controllable hinge assembly (not shown).

A partial section of a panel 712 is shown, with its associated portion of the frame 710 rotated 180 degrees to illustrate detail of a panel connector 718 configured to interface with the electromagnetic element 714, in accordance with embodiments. The panel connector 718 is defined by a surface containing an embedded magnetic or magetizable element 716, such as a permanent magnet. In operation, the panel 712 is supported at the panel connector 718 by the electromagnetic element 714 until the control mechanism 720 causes the electromagnetic element to deactivate or to disengage, at which time the panel drops. In some cases, the electromagnetic element 714 can be disengaged without moving parts by, e.g., cutting a power supply to the electromagnetic element. In some other embodiments, the electromagnetic element 714 may be reversed, shielded, or moved away from an interior wall of the frame 710.

In accordance with embodiments, the peripheral portion 712*b* can interact with a stop element 724 connected with the frame 710, so that the rotation of the panel about the pivot axis 740 is stopped short at an angle that is predetermined based on the position of the stop element. The stop element 724 can include a receiving feature 726, such as a void, positioned to receive and retain an extension 728 of the panel 712. In operation, the receiving feature 726 retaining the extension 728 can act as a fail-safe, by which the receiving feature 726 supports the panel 712 in the event that the panel is improperly released by the electromagnetic element 714 when the opposite hinge has already been released. Additionally, similar to the stop elements described in relation to FIG. 5, stop element 724 may be configured to stop the panel from rotating more than 45 degrees from its closed position in order to direct the item 110 to a bin disposed to the side of the frame from which the hinge has been released.

Figure 8:
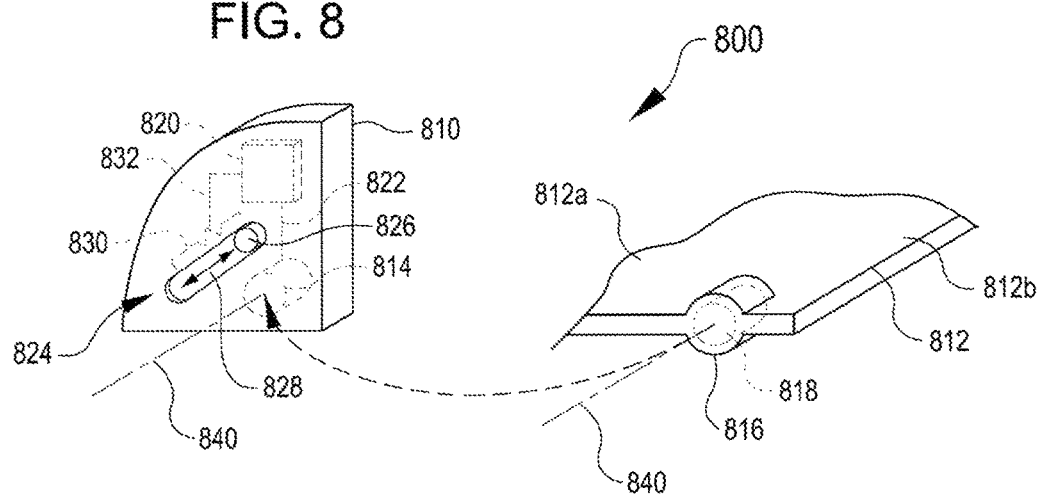
FIG. 8 shows a fifth example of a dual-sided sorting mechanism for a conveyor.

FIG. 8 shows a fifth example of a dual-sided sorting mechanism 800 for a conveyor, in accordance with embodiments. A partial section of a conveyor frame 810 is shown, including therein an embedded control mechanism 820 and control circuit 822 connected with an electromagnetic element 814. The electromagnetic element 814 acts as second portion (i.e. controllable portion) of a controllable hinge assembly for the sorting mechanism 800. A magnetic or magetizable panel connector 816 acts as a first portion of the controllable hinge assembly. The panel 812 can be retained at the electromagnetic element 814, released at the electromagnetic element, or can rotate about a pivot axis 840 defined by the electromagnetic element and panel connector 816 when the connector is retained at the electromagnetic element and released at a second controllable hinge assembly (not shown).

A partial section of a panel 812 is shown, with its associated portion of the frame 810 rotated 180 degrees to illustrate detail of a panel connector 816 configured to interface with the electromagnetic element 814, in accordance with embodiments. The panel connector 816 is defined by a surface containing an embedded magnetic or magentizable element 818, such as a permanent magnet. In operation, the panel 812 is supported at the panel connector 816 by the electromagnetic element 814 until the control mechanism 820 causes the electromagnetic element to deactivate or to disengage, at which time the panel drops. In some cases, the electromagnetic element 814 can be disengaged without moving parts by, e.g., cutting a power supply to the electromagnetic element. In some other embodiments, the electromagnetic element 814 may be reversed, shielded, or moved away from an interior wall of the frame 810.

In accordance with embodiments, the peripheral portion 812*b* can interact with a recovery mechanism 824 connected with the frame 810, when the panel is in an open position and released from an opposing controllable hinge assembly (not shown). The recovery mechanism 824 includes an extension 826 connected with an actuator 830 and operably connected with the control mechanism 820 by a secondary control circuit 832. The extension 826 is connected with the frame 810 via the actuator 830 and movably connected with the frame, e.g. via a sliding connection 828. At rest, the extension 826 can be positioned outside of a path of travel of the panel 812. In some embodiments, at rest, the extension 826 can act as a stopping element, positioned in a path of travel of the panel 812 and positioned to limit a degree to which to the panel opens when released. In operation, the recovery mechanism 824 can be activated to restore the panel 812 from a released configuration to a closed configuration. Specifically, the control mechanism 820 can cause the actuator 830 to physically move the extension 826 along the sliding connection 828, where the extension mechanically interferes with the panel 812 to rotate the panel and revert the panel to the closed, transport configuration from an open, released configuration.

Figure 9:
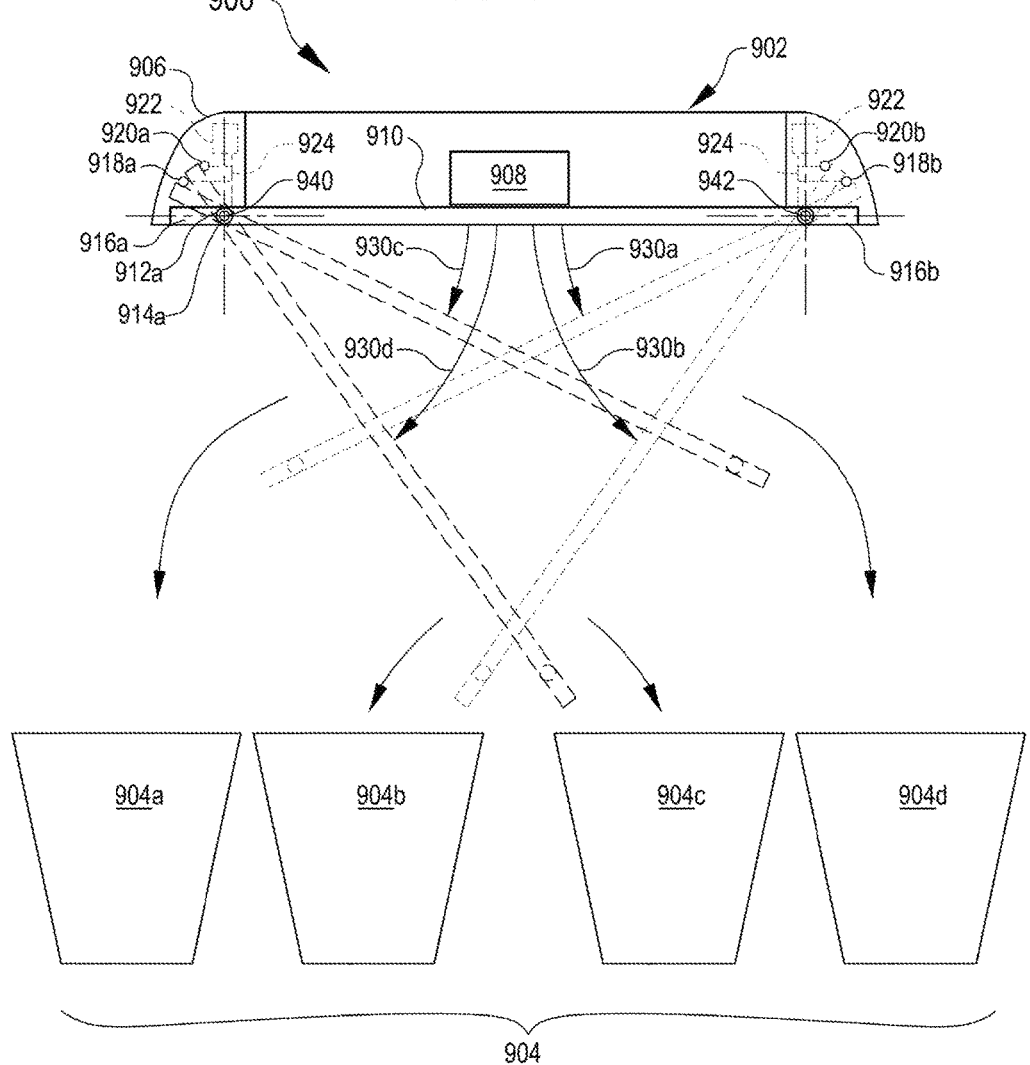
FIG. 9 is a side section view of a conveyor employing an alternative dual-sided sorting mechanism having more than two sorting positions.

FIG. 9 shows a side section view of a conveyor 902 employing an alternative dual-sided sorting mechanism 900 for sorting to more than two receiving bins 904. Previous examples shown above illustrated sorting mechanisms operable to drop a panel in either of two directions. However, an alternative sorting mechanism can be operable to drop a panel by various predetermined amounts in each of the two directions. As shown, the conveyor 902 includes a frame 906 and a set of first and second controllable hinge assemblies 940, 942 that are operable to retain, or selectively release, each of two respective ends 916*a*, 916*b* of a panel 910. Specifically, the panel 910 is pivotably and also removably connected with the frame 906 via the first and second controllable hinge assemblies 940, 942, each assembly defining respective first and second axes of rotation around which the panel can rotate when disconnected from the frame at the other of the two controllable hinge assemblies. The first controllable hinge assembly 940 has a first portion 914*a* coupled to the panel 910 proximate to the first end 916*a* of the panel, and a second portion 912*a* coupled to the frame 906. The second controllable hinge assembly 942 has a first portion 914*b* coupled to the panel 910 proximate to the second end 916*b* of the panel, and a second portion 912*b* coupled to the frame 906. According to embodiments, each of the respective second portions 912*a,b* of the first and second controllable hinge assemblies 940,942 can define a respective controllable hinge element configured to release a respective first portion 914*a,b*; each first portion defining a connective element that interacts with a respective second portion to retain the panel. The panel 910 is operable to retain an item 908 when in a closed position, which corresponds to a transport configuration, and operable to deposit the item in various specific directions when opened into a released configuration in either direction.

The conveyor 902 includes a first set of retractable stops 918a, 918b (cumulatively 918) and a second set of stops 920a, 920b (cumulatively 920). In certain embodiments, the second set of stops 920 may be fixed, or may also be retractable. The stops 918, 920 are positioned to interact with the first and second ends 916a, 916b, of the panel 910. In operation, the conveyer can be reconfigured to adopt a first open configuration 930a or a second open configuration 930c by retaining the first set of stops 918 in position, and selectively releasing the panel 910 by either of the controllable hinge assemblies. The panel 910 assumes the first open configuration 930a when permitted to rotate around the second controllable hinge assembly 942 and when obstructed by a second stop 918b of the first set of stops. Similarly, the panel 910 assumes the second open configuration 930c when permitted to rotate around the first controllable hinge assembly 940 and when obstructed by a first stop 918a of the first set of stops. The first and second open configurations 930a, 930c are operable to direct the item 908 to the first or fourth receiving stations 904a, 904d, respectively. Similarly, by retracting the first set of stops 918 and leaving only the second set of stops 920, the conveyor can be reconfigured to adopt a third or fourth open configuration 930b, 930d, respectively, by selectively releasing the panel 910 by either of the controllable hinge assemblies. The panel 910 assumes the third open configuration 930b when permitted to rotate around the second controllable hinge assembly 942 and when obstructed by a second stop 920b of the second set of stops. Similarly, the panel 910 assumes the fourth open configuration 930d when permitted to rotate around the first controllable hinge assembly 940 and when obstructed by a first stop 920a of the second set of stops. The third and four open configurations 930b, 930d are operable to direct the item 908 to the second and third receiving stations 904b, 904c, respectively.

In specific embodiments, the angle of rotation defining the released configurations can vary from about 25 degrees to about 50 degrees for the first and second open configurations 930a, 930c, and from about 40 to 80 degrees for the third and four open configurations 930b, 930d. In any event, the angle of rotation for the first and second open configurations 930a, 930c is less than the angle of rotation of the third and fourth open configurations 930b, 930d. The specific angle ranges are selected to divert the item 908 to a specific receiving station, and depend in part on the relative size of each receiving station and the relative position of each receiving station below the conveyor 902.

Figure 10:
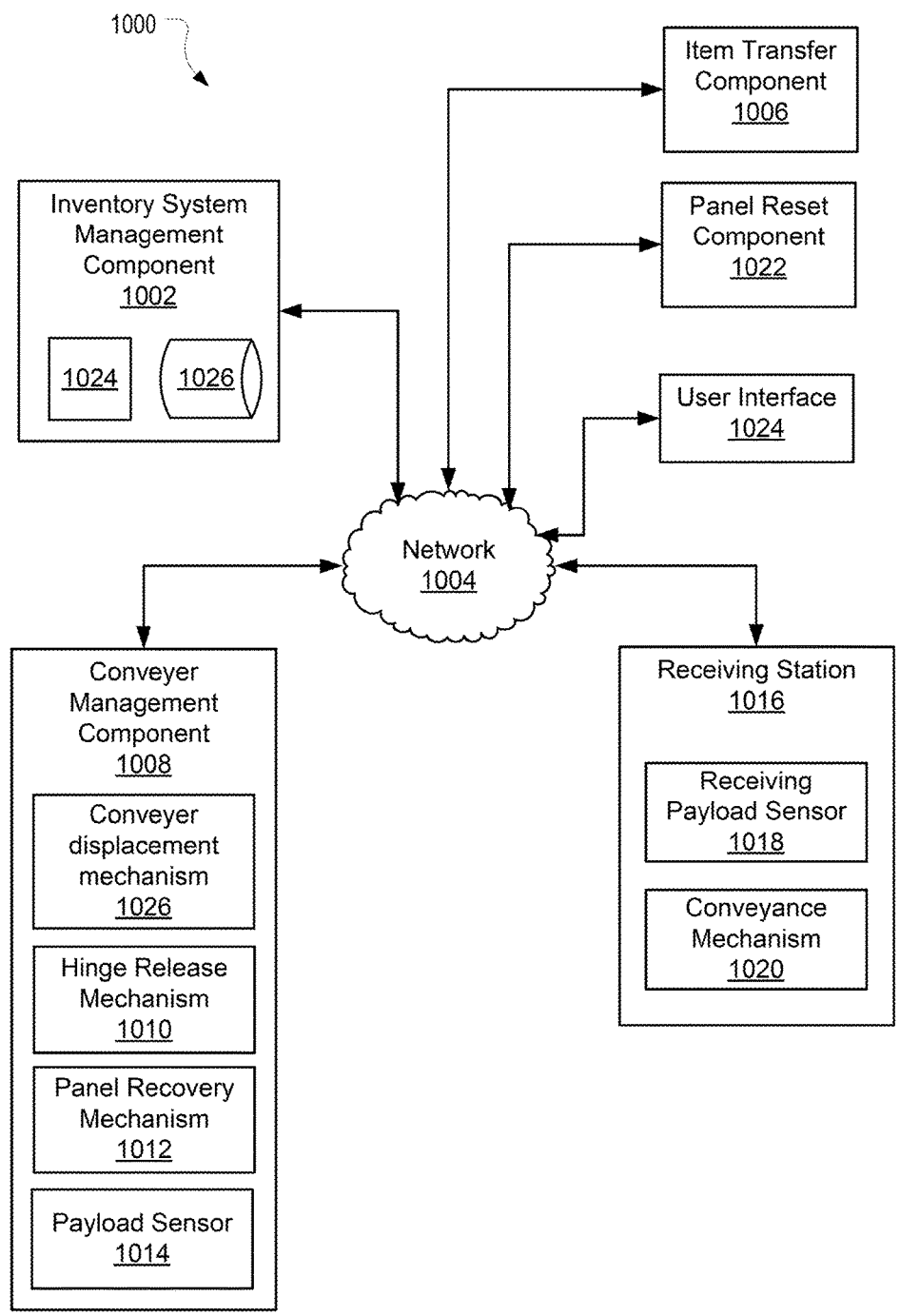
FIG. 10 is a simplified block diagram illustrating an example system for controlling an inventory management system employing dual sided gravity sorting conveyors.

FIG. 10 is a simplified block diagram illustrating an example system 1000 for controlling an inventory management system employing dual sided gravity sorting conveyors, in accordance with embodiments. The system 1000 is suitable to control a sorting or item transportation system, such as but not limited to systems 100, 200, 300, and 900 as shown above with reference to FIGS. 1, 2, 3, and 9.

The control system 1000 can include any or all of, or any suitable combination of the following modules. An inventory system management component 1002 is operable to send and receive data to control various aspects of the system, including the movement of conveyors, the transfer of items to conveyors, and the sorting and deposition of items from the conveyors to various receiving destinations based on, e.g., user inputs received from a user interface 1024. The inventory system management component 1002 can include a processor 1024 and non-transitory memory store 1026 containing executable instructions for managing the system 1000. The inventory system management component is capable of communicating via a network 1004 with a conveyor management component 1008 for directing the conveyor, with a receiving station 1016 for sorting and/or receiving items from the conveyor and for managing downstream processes, and with various other system components including an item transfer component 1006 for introducing items to the conveyor, with a reset component 1022 for resetting an open panel of the conveyor, and with a user interface 1024 for receiving user commands or for providing indications to a user, among other components.

An item transfer component 1006 is operable to deposit items to a conveyor based on instructions from the inventory system management component 1002. The item transfer component can include any suitable means for placing an item into a discrete conveyor, such as a robotic arm, conveyor belt, discrete mechanical or robotic conveyor, chute, or other comparable device. In some cases, the item transfer component can include one or more sensors for determining a position of the conveyor prior to transferring an item, so that the transfer component only transfers an item when the conveyor is in the correct position. In other cases, the item transfer component and conveyor are both actuated under the direct control of the inventory system management component 1002.

A reset component 1022 is operable to return a releasable panel of the conveyor from an open position to a closed position to reset the conveyor to receive new items. In some embodiments, the reset component 1022 corresponds to a portion of the conveyance path through which the conveyor is directed in order to reset the panel by external action. In some other embodiments, the reset component 1022 can include one or more actuators and control elements of the conveyor which are actuated after an item has been deposited, in order to actively revert the panel to a closed position.

A conveyor management component 1008 can receive commands from the inventory system management component 1002 for directing physical actions at the conveyor. For example, the conveyor management component 1008 can include a conveyor displacement mechanism 1026, which controls one or more actuators for moving the conveyor along a conveyance path and/or for causing the conveyor to select and transit an appropriate branch in a branched conveyance path. The conveyor displacement mechanism 1026 and may further include one or more actuators in the conveyance path for diverting the conveyor in transit. A hinge release mechanism 1010 can include a control conveyance path for separately activating or deactivating (i.e. retaining or selectively releasing) each hinge assembly of the conveyor. In embodiments of conveyors that employ an electromagnetic hinge assembly, the hinge release mechanism 1010 can further include a power supply for activating the electromagnetic components. A panel recovery mechanism 1012 can include a control conveyance path and actuator for reverting an open panel to a closed position. A payload sensor 1014 can also be included in the conveyor management component, and operable to detect the weight of an item on the panel when the panel is closed. The payload sensor 1014 can communicate a loaded or unloaded status to the inventory system management component, from which the system can determine whether an item has been retained by the conveyor, or to detect a failure mode if the item is retained beyond a point where it should have been deposited.

A sorting/receiving destination can include any suitable surface, chute, or vessel such as a tote or bin for receiving an item, as well as various components for managing item receipt and downstream processes. For example, according to some embodiments, the sorting/receiving destination may include a receiving payload sensor 1018 for detecting a weight of a received item at the sorting/receiving station. The receiving station 1016 can also include one or more downstream mechanisms, such as a secondary conveyance mechanism 1020 for removing a deposited item and transporting it to further stations, such as to a storage location, to a shipping/receiving station, or other destination in an inventory system.

Figure 11:
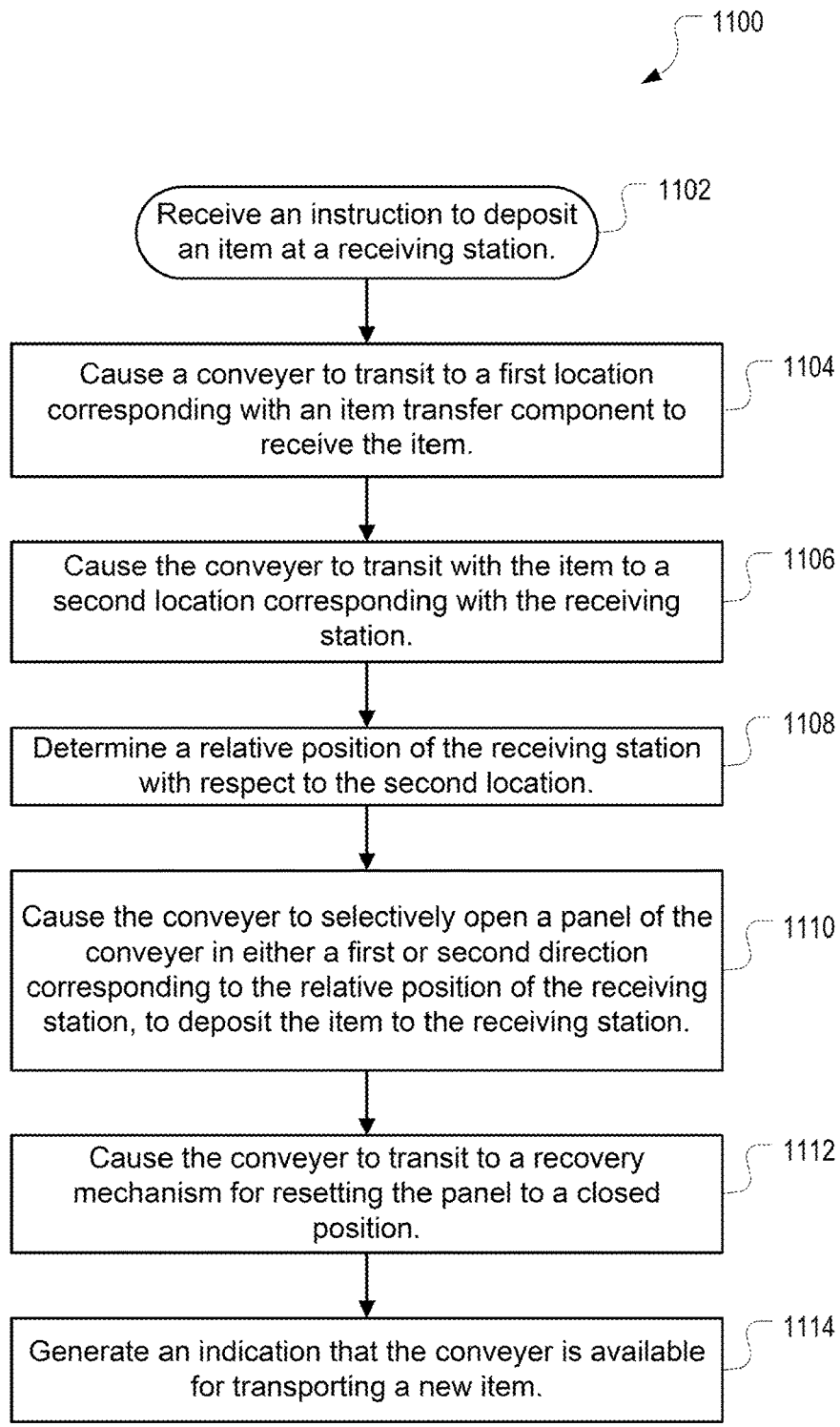
FIG. 11 illustrates a first example of a process for sorting an item via a dual sided gravity sorting conveyor.

FIG. 11 illustrates a first example process 1100 for sorting an item via a dual sided gravity sorting conveyor, in accordance with embodiments. Aspects of the process 1100 may be performed, in some embodiments, by a system similar to the system 1000 discussed with reference to FIG. 10. The system may be implemented by sorting or item transportation systems such as systems 100, 200, 300, or 900, as discussed with reference to FIGS. 1-3 and 9.

In accordance with embodiments, an instruction can be received at a sorting or item transportation system to deposit an item at a receiving station (act 1102). In response, the system can cause a conveyor to transit via a conveyance path to a first location in order to receive the item at a loading station or comparable item transfer component (act 1104). The item is received on a releasable panel of the conveyor. Once the conveyor retains the item, the conveyor can transit along the conveyance path with the item to a second location that corresponds with the designated receiving station (act 1106). The receiving station is generally positioned below and offset in a first or second direction relative to the conveyor as it is retained by the conveyance path. The system determines the relative position, i.e. the side of the conveyor on which the receiving station is positioned (act 1108). For example, the system can access a record of the position of the receiving station. The system can selectively position a stopping element so that, when the panel is released to an open position by a selectively actuated hinge release mechanism, the stopping element orients the panel to divert the item to the receiving station (act 1110).

According to some embodiments, the system can recover the panel from an open position to a closed position by moving the conveyor through a recovery mechanism, which can include a physical ramp, rail, or other sloped element therein that engages with an underside of the open panel in order to reset the panel in a closed position (act 1112). Once the item has been deposited at the designated receiving station and the panel has been reset, the system can generate an indication that the conveyor is available for transporting a new item (act 1114).

Figure 12:
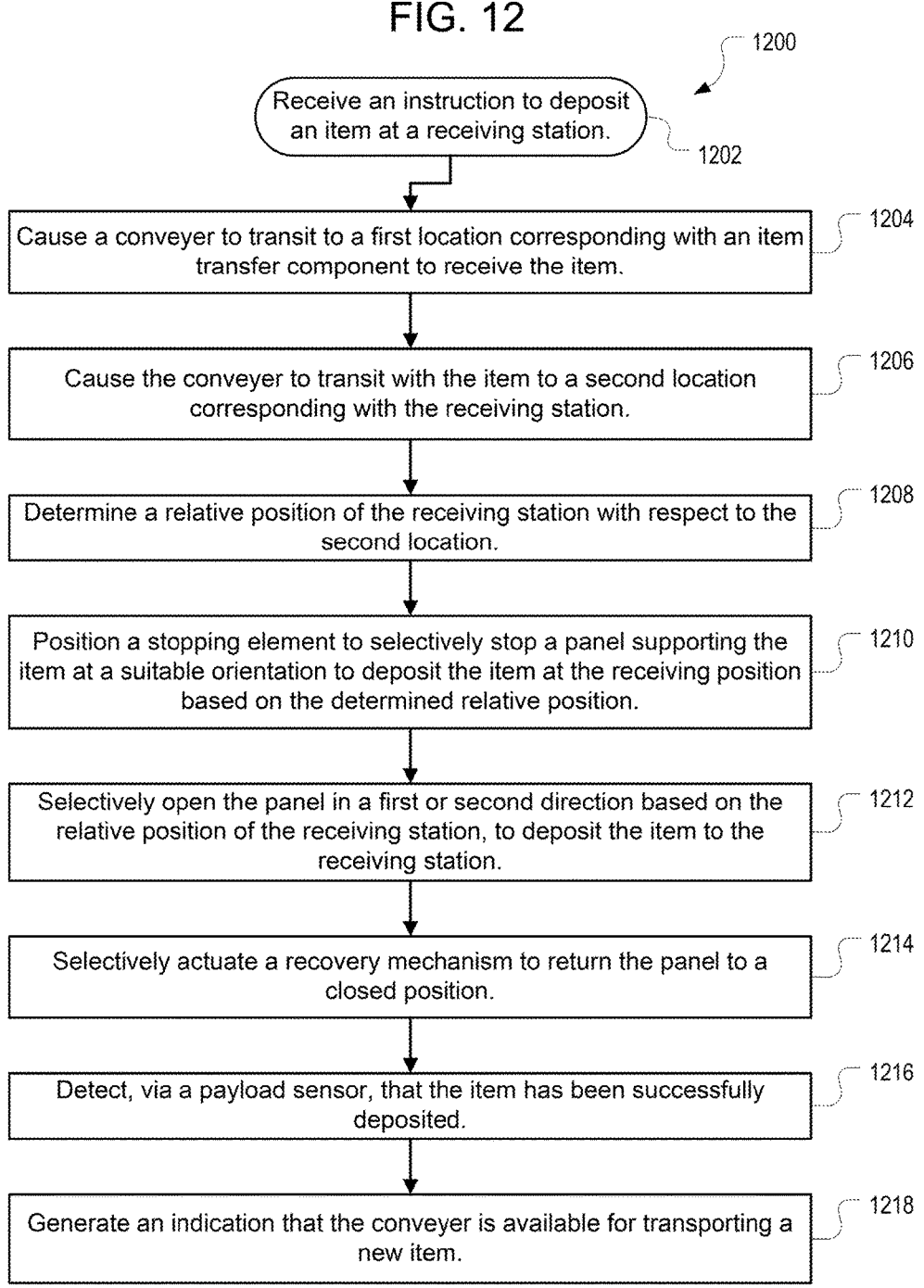
FIG. 12 illustrates a second example of a process for sorting an item via a dual sided gravity sorting conveyor.

FIG. 12 illustrates a second example process 1200 for sorting an item via a dual sided gravity sorting conveyor, in accordance with embodiments. Aspects of the process 1200 may be performed, in some embodiments, by a system similar to the system 1000 discussed with reference to FIG. 10. The system may be implemented by sorting or item transportation systems such as systems 100, 200, 300, or 900, as discussed with reference to FIGS. 1-3 and 9.

In accordance with embodiments, an instruction can be received by a sorting or item transportation system to deposit an item at a receiving station (act 1202). In response, the system can cause a conveyor to transit via a conveyance path to a first location in order to receive the item at a loading station or comparable item transfer component (act 1204). The item is received on a releasable panel of the conveyor. Once the conveyor retains the item, the conveyor can transit along the conveyance path with the item to a second location that corresponds with the designated receiving station (act 1206). The receiving station is generally positioned below and offset in a first or second direction relative to the conveyor as it is retained by the conveyance path. However, in some cases, the receiving station can be positioned at varying distances from a centerline immediately below the conveyor. The system determines the relative position of the receiving station with respect to the second location, or to the conveyor (act 1208). For example, the system can access a record of the position of the receiving station. In one specific example, for a four-position gravity inventory management system as described above with reference to FIG. 9, the position of the receiving station can include four positions relative to the receiving station, although in alternative embodiments, more or fewer positions may be available. The system can selectively position a stopping element so that, when the panel is released to an open position by a selectively actuated hinge release mechanism, the stopping element orients the panel to divert the item into the appropriate receiving station (act 1210). In embodiments that divert the item between only two directions, a stopping element may be fixed. The system then selectively actuates a hinge release mechanism proximate to a first or second end of the panel in order to release the panel, allowing the panel to pivot freely about another hinge mechanism proximate to other end of the panel, dropping the panel in the selected first or second direction to deposit the item at the receiving station (act 1212).

According to some embodiments, the system can actively recover the panel from an open position to a closed position by selectively actuating a recovery mechanism of the conveyor (act 1214). Furthermore, in some embodiments, the system can detect successful delivery, or log delivery failure, by detecting the deposition of the item via a payload sensor (act 1216). In specific embodiments, payload sensors (such as pressure sensors, optical sensors, optical sensors, or other forms of sensor) can be integrated with the conveyor, with the receiving station, or both. Once the item has been deposited at the designated receiving station, the system can generate an indication that the conveyor is available for transporting a new item (act 1218).

Some or all of the processes 1100 or 1200 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Aspects of the processes 1100 and 1200, including mechanisms described as well as specific process steps, may be combined unless explicitly stated otherwise.

Figure 13:
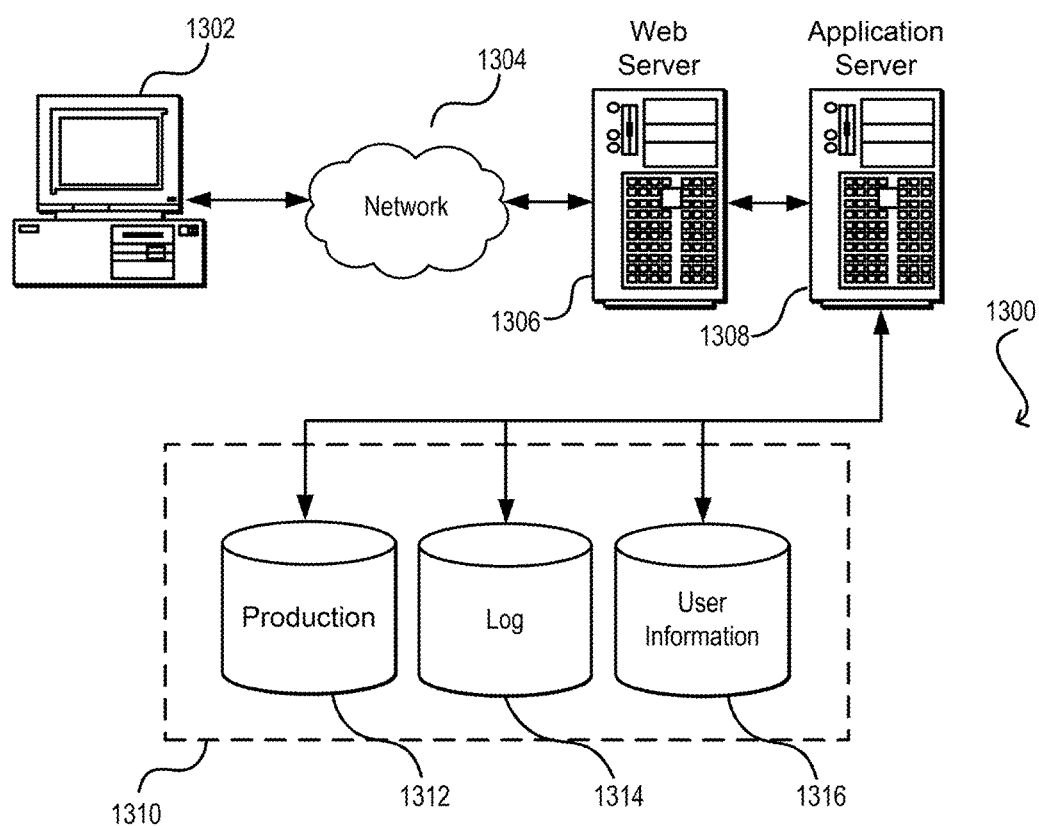
FIG. 13 illustrates an environment in which various embodiments can be implemented.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes an electronic client device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the system 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A conveyor system, comprising:
   at least one support rail extending along a conveyance path;
   a conveyor configured to transport an item along the conveyance path, the conveyor comprising:
      a frame supported by the at least one support rail;
      a panel;
      a first controllable hinge assembly having a first portion coupled to the panel and a second portion coupled to a first side of the frame, the first controllable hinge assembly defining a first axis of rotation of the panel; and
      a second controllable hinge assembly having a first portion coupled to the panel and a second portion coupled to a second side of the frame, the second side being opposite to the first side, the second controllable hinge assembly defining a second axis of rotation of the panel,
   wherein the conveyor has a transport configuration in which the panel is attached to the frame by the first and second controllable hinges, a first release configuration in which the first portion of the first controllable hinge is detached from the frame and free to rotate about the second axis so as to be spaced apart from the second portion of the first controllable hinge, and a second release configuration in which the first portion of the second controllable hinge is detached from the frame and free to rotate about the first axis so as to be spaced apart from the second portion of the second controllable hinge, wherein releasing the panel from the transport configuration to either the first or second release configuration is operable to cause release of an item supported by the panel; and
      a control module having a processor and memory containing executable instructions that, when executed by the processor, cause the control module to:
         receive an instruction to deposit the item at a receiving station;
         cause the item to be transported along the conveyance path via the conveyor in the transport configuration from a first position to a second position adjacent the receiving station; and
         cause the conveyor to reconfigure from the transport configuration to one of the first and second release configurations so as to deposit the item at the receiving station.

2. The system of claim 1, wherein:
   the conveyance path comprises a plurality of branching paths disposed at different horizontal positions relative to each other, each branching path being positioned between respective first and second receiving stations including the receiving station; and
   the control module is further configured to cause the item to be transported along a predetermined branching path proximate to the receiving station.

3. The system of claim 1, wherein:
   the conveyance path comprises a plurality of branching paths disposed in a stacked configuration at different vertical positions relative to each other; and further comprising:
      a plurality of receiving stations including the receiving station, the plurality of receiving stations including a first subset of two or more receiving stations aligned with each other and at different vertical positions, and a second subset of two or more receiving stations aligned with each other and at different vertical positions, wherein:
         the first subset of two or more receiving stations is positioned adjacent the plurality of rails in a first orthogonal direction from the plurality of rails; and
         the second subset of two or more receiving stations is positioned adjacent the plurality of rails in a second orthogonal direction from the plurality of rails opposite the first direction.

4. The system of claim 1, wherein:
   the first controllable hinge assembly further comprises first and second stopping elements coupled with the first side of the frame and second side of the frame, respectively, and operable to mechanically interfere with the panel to retain the panel in a first open position or a second open position when the cart is configured in one of the first or second release configurations, respectively;
   first and second actuators connected with the first and second stopping elements, respectively, and operable to retract the first and second stopping elements to prevent the first and second stopping elements from interfering with the panel; and
   the second controllable hinge assembly further comprises third and fourth stopping elements coupled with the first side of the frame and the second side of the frame, respectively, and operable to mechanically interfere with the panel to stop the panel in a third open position or fourth open position when the cart is configured in one of the first or second release configurations, respectively, when the first and second stopping elements are not engaged with the panel, wherein
   the control module is further configured to cause the cart to selectively retract the first and second stopping elements to selectively direct the panel to one of the first open position, second open position, third open position, or fourth open position when the cart is reconfigured to the one of the first and second release configurations.

5. The system of claim 1, further comprising:
   a recovery mechanism comprising an extension movably connected with the frame of the conveyor and operably connected with an actuator, the extension being positioned to mechanically interfere with the panel when the panel is configured in one of the first or second release configurations;
   wherein the control module is further configured to cause the recovery mechanism to actuate the extension via the actuator, to move the panel from the first or second release configuration to the transport configuration.

6. The system of claim 1, further comprising:
   a recovery mechanism having an upstream portion and a downstream portion and comprising a sloped element, the sloped element positioned parallel to the conveyance path and positioned to engage with the panel as the cart is moved along the conveyance path from the upstream portion to the downstream portion, wherein the sloped element extends upwardly toward the conveyance path from the upstream portion to the downstream portion such that, the sloped element engages with the panel when the panel is configured in the first or second release configurations while the cart is moved along the recovery mechanism from the upstream portion toward the downstream portion; and the sloped element raises the panel and causes the cart to reconfigure to the transit configuration as the cart is moved through the downstream portion.

7. The system of claim 1, wherein:

the first controllable hinge assembly comprises a first retractable element connected with a first actuator for retracting the first retractable element; and the second controllable hinge assembly comprises a second retractable element connected with a second actuator for retracting the second retractable element;

the first and second retractable elements being configured to mechanically interfere with the panel, wherein:

the control module is further configured to cause the conveyor to reconfigure from the transport configuration to one of the first and second release configurations panel by selectively retracting one of the first or second retractable elements.

8. The system of claim 1, wherein:

the first controllable hinge assembly comprises a first electromagnetic element operably connected with a first power source via an onboard control element;

the second controllable hinge assembly comprises a second electromagnetic element operably connected with a second power source via the onboard control element;

the panel comprises first and second permanent magnetic elements positioned proximate to respective first and second ends of the panel and operable to interact with the first and second electromagnetic elements when the panel is in the closed position; and the control module is further configured to cause the conveyor to reconfigure from the transport configuration to one of the first and second release configurations by selectively deactivating the first or second electromagnetic element.

9. The conveyor of claim 1, wherein the first and second controllable hinge assemblies are configured to cause release of the panel by, respectively, selectively decoupling the panel from one of the first or second sides of the frame to cause the panel to pivot under the force of gravity.

10. A computer implemented method for sorting an item, the method comprising:

causing a first item to be placed in a rail-mounted conveyor;

causing the conveyor to move the first item along a conveyance path;

causing a first controllable hinge assembly of the conveyor to release to selectively open a panel of the conveyor by detaching the panel from the first controllable hinge assembly, to allow the panel to rotate around a second axis of rotation defined by a second controllable hinge assembly from a transport configuration where the panel supports the first item to a first released configuration where the panel releases and directs the item in a first direction such that the first item is deposited in the first direction to the first receiving station via gravity;

causing a second item to be placed in the conveyor;

causing the conveyor to move the second item along the conveyance path; and causing the second controllable hinge assembly of the conveyor to release to selectively open the panel of the conveyor detaching the panel from the first controllable hinge assembly, to allow the panel to rotate around a first axis of rotation defined by the first controllable hinge assembly from the transport configuration where the panel supports the second item to a second released configuration where the panel releases and directs the item in a second direction, opposing the first direction, such that the second item is deposited in the second direction to the second receiving station via gravity, the second controllable hinge assembly being different from the first controllable hinge assembly.

11. The computer implemented method of claim 10, further comprising the steps of:

causing the first controllable hinge assembly of the conveyor to release to selectively open the panel of by deactivating a first electromagnetic element connected with the first controllable hinge assembly; and causing the second controllable hinge assembly of the conveyor to release to selectively open the panel by deactivating a second electromagnetic element connected with the second controllable hinge assembly.

12. The computer implemented method of claim 10, further comprising:

before causing the second item to be placed in the conveyor cart, causing the conveyor to reset the panel in the transport configuration by causing the conveyor to transit a recovery mechanism from an upstream portion of the recovery mechanism to a downstream portion of the recovery mechanism, the recovery mechanism comprising a sloped element positioned adjacent the conveyance path that extends upwardly toward the conveyance path from the upstream portion to the downstream portion.

13. The computer implemented method of claim 10, further comprising:

positioning a stopping element to selectively stop the panel at a predetermined orientation based on the relative position of the receiving station with respect to the conveyor such that, when the first or second controllable hinge assemblies selectively release the panel to the first or second released configuration, respectively, the stopping element prevents the panel from opening beyond the predetermined orientation.

14. The computer implemented method of claim 10, further comprising:

detecting, via a sensor, that the first item has been deposited to the first receiving station; and causing the conveyor to actuate an onboard recovery mechanism to revert the panel to the transport configuration based on the detecting that the first item has been deposited.

15. The conveyor of claim 10, wherein:

the conveyor comprises a frame having first and second sides, the first side coupled to the first controllable hinge assembly and the second side coupled to the second controllable hinge assembly, and detaching the panel from either one of the first and second controllable hinge assemblies comprises selectively decoupling the panel from the respective first or second side of the frame to cause the panel to pivot under the force of gravity.

16. A conveyor, comprising:
a frame configured to move along a support rail;
a panel;
a first controllable hinge assembly having a first portion coupled to the panel and a second portion coupled to a first side of the frame, the first controllable hinge assembly defining a first axis of rotation of the panel; and
a second controllable hinge assembly having a first portion coupled to the panel and a second portion coupled to a second side of the frame, the second side being opposite to the first side, the second controllable hinge assembly defining a second axis of rotation of the panel different from the first axis and spaced apart from the first axis,
wherein the conveyor has a transport configuration in which the panel is attached to the frame by the first and second controllable hinges, a first released configuration in which the first portion of the first controllable hinge is detached from the frame and free to rotate about the second axis so as to be spaced apart from the second portion of the first controllable hinge, and a second released configuration in which the first portion of the second controllable hinge is detached from the frame and free to rotate about the first axis so as to be spaced apart from the second portion of the second controllable hinge, and wherein releasing the panel from the transport configuration to either the first or second released configuration is operable to cause release of an object supported by the panel.

17. The conveyor of claim 16, wherein:
the first controllable hinge assembly comprises a first retractable pin operably connected with the frame via a first actuator for withdrawing the first retractable pin into the frame, the first retractable pin being operable to interact with the first portion of the first controllable hinge assembly to support the panel at the first controllable hinge assembly when the first retractable pin is extended;
the second controllable hinge assembly comprises a second retractable pin connected with the frame via a second actuator for withdrawing the second retractable pin into the frame, the second retractable pin being operable to interact with the first portion of the second controllable hinge assembly to support the panel at the second controllable hinge assembly when the second retractable pin is extended.

18. The conveyor of claim 16, wherein:
the first controllable hinge assembly comprises a first electromagnetic element connected with the frame and operably connected with a first power source, and a first permanent magnetic element connected with the panel and arranged to interact with the first electromagnetic element, the first controllable hinge assembly being configured to support the panel by the first electromagnetic element interacting with the first permanent magnetic element when the first electromagnetic element is magnetized;
the second controllable hinge assembly comprises a second electromagnetic element connected with the frame and operably connected with a second power source, and a second permanent magnetic element connected with the panel and arranged to interact with the first electromagnetic element, the second controllable hinge assembly being configured to support the panel by the second electromagnetic element interacting with the second permanent magnetic element when the first electromagnetic element is magnetized; and
the first and second controllable hinge assemblies are operable to selectively release the panel to the first or second released configurations, respectively, by selectively demagnetizing the first or second electromagnetic elements.

19. The conveyor of claim 16, further comprising:
first and second actuators connected with the frame proximate the first and second controllable hinge assemblies, respectively, wherein:
the first actuator is positioned adjacent the panel proximate the first controllable hinge assembly and operable to mechanically interfere with the panel when activated to impart impulse to open the panel when the panel is released to the second released configuration;
the second actuator is positioned adjacent the panel proximate the second controllable hinge assembly and operable to mechanically interfere with the panel when activated, to impart impulse to open the panel when the panel is released to the first released configuration.

20. The conveyor of claim 16, further comprising:
first and second stopping elements connected with the frame of the conveyor proximate the first and second controllable hinge assemblies, respectively, wherein:
the first stopping element is positioned in a first path of the first end of the panel when the panel opens to the second released configuration, such that the first stopping element is operable to retain the panel at a predetermined second angle when the panel is open in the second released configuration; and
the second stopping element is positioned in a second path of the second end of the panel when the panel opens to the first released configuration, such that the second stopping element is operable to retain the panel at a predetermined second angle when the panel is open in the first released configuration.

21. The conveyor of claim 20, further comprising:
a first flange extending from the panel proximate the first end of the panel;
a second flange extending from the panel proximate the second end of the panel; wherein:
the first stopping element comprises a first retaining feature aligned with and operable to retain the first flange when the panel is open in the second released configuration; and
the second stopping element comprises a second retaining feature aligned with and operable to retain the second flange when the panel is open in the first released configuration.

22. The conveyor of claim 16, further comprising:
first and second actuators connected with the frame of the conveyor proximate the first and second controllable hinge assemblies, respectively, wherein:
the first actuator is positioned adjacent the panel proximate the first controllable hinge assembly and operable to mechanically interfere with the panel when activated, the first actuator arranged to revert the panel to the transport configuration from the second released configuration when the first actuator is activated;
the second actuator is positioned adjacent the panel proximate the second controllable hinge assembly and operable to mechanically interfere with the panel when activated, the second actuator arranged to revert the panel to the transport configuration from the first released configuration when the second actuator is activated.

23. The conveyor of claim 16, wherein the first and second controllable hinge assemblies are configured to cause release of the panel by, respectively, selectively decoupling the panel from one of the first or second sides of the frame to cause the panel to pivot under the force of gravity.

* * * * *